United States Patent [19]

Carter

[11] Patent Number: 5,022,481

[45] Date of Patent: Jun. 11, 1991

[54] EMERGENCY POWER STEERING BACKUP APPARATUS AND METHOD

[76] Inventor: Daniel C. Carter, 102 W. Davis, Luling, Tex. 78648

[21] Appl. No.: 623,270

[22] Filed: Dec. 6, 1990

Related U.S. Application Data

[63] Continuation of Ser. No. 472,038, Jan. 30, 1990, abandoned.

[51] Int. Cl.$^5$ .............................................. B62D 5/06
[52] U.S. Cl. ........................................ 180/133; 60/405
[58] Field of Search .................... 180/133; 60/405, 403

[56] References Cited

U.S. PATENT DOCUMENTS

| | | | |
|---|---|---|---|
| 3,434,282 | 3/1969 | Shelhart | 180/133 |
| 3,762,492 | 10/1973 | Ron | 180/133 |
| 4,114,720 | 9/1978 | Ericson et al. | 180/133 |
| 4,190,130 | 2/1980 | Beck | 180/133 |
| 4,204,584 | 5/1980 | de Maight | 180/133 |
| 4,476,677 | 10/1984 | Hanshaw | 180/133 |
| 4,574,904 | 3/1986 | Goode | 180/133 |

Primary Examiner—Mitchell J. Hill
Attorney, Agent, or Firm—J. Nevin Shaffer, Jr.; Russell D. Culbertson

[57] ABSTRACT

An emergency power steering backup apparatus is adapted for supplying a vehicle's power steering unit with an emergency supply of power steering fluid only when the vehicle's primary power steering pump fails to provide fluid under sufficient pressure while the vehicle is traveling above a minimum activating speed. A pressure sensor and pressure operated switch along with a vehicle speed sensor and vehicle speed operated switch preferably provide an activating signal for activating the emergency fluid supply. The pump pressure and the vehicle speed sensors and their respective switches operate to ensure that the emergency fluid supply is activated only in an emergency situation. As an alternative, or in addition to the pump pressure and vehicle speed sensors and their respective switches, a pump drive linkage sensor may be included in the apparatus for providing a signal for activating the emergency fluid supply upon failure of the pump drive linkage. The method of the invention includes charging an emergency power steering fluid supply, preferably manually, and then activating the emergency fluid supply for powering the vehicle's power steering unit only when the power steering pump pressure fails below a minimum level while the vehicle is traveling at a speed above a minimum activating speed.

16 Claims, 2 Drawing Sheets

EMERGENCY POWER STEERING BACKUP APPARATUS AND METHOD

BACKGROUND OF THE INVENTION

This application is a continuation of application Ser. No. 472,032, filed Jan. 30, 1990, now abandoned.

The invention relates to a device for powering a vehicle's hydraulic steering unit upon the failure of the vehicle's primary hydraulic fluid supply, and particularly, to a hydraulic power steering backup system that is inexpensive and easily adapted for use in small vehicles. The invention also encompasses a method for providing backup hydraulic fluid for operating a vehicle's hydraulic power steering unit.

Many automobiles have hydraulically operated steering systems or power assisted steering systems. These hydraulic steering systems generally include a hydraulic pump that is driven by the vehicle engine for providing hydraulic fluid at a desired operating pressure. Hydraulic fluid from the pump is supplied through a suitable high pressure connecting line to a power steering unit where the fluid is used in steering the vehicle. A low pressure connecting line returns the hydraulic fluid from the power steering unit back to the hydraulic pump to complete the hydraulic circuit.

Although hydraulically operated power steering systems may enable one to easily steer even large vehicles, such systems are dependent upon the hydraulic pump. If a vehicle's hydraulic pump fails to provide sufficient high pressure hydraulic fluid due to some mechanical problem within the pump itself or to failure of the pump drive linkage, the vehicle usually becomes very difficult or impossible to steer. This difficulty in steering may cause the driver to lose control of the vehicle, particularly if the vehicle is travelling at highway speed.

Emergency hydraulic fluid supply circuits for providing an emergency reserve of hydraulic fluid under a desired operating pressure are known. U.S. Pat. No. 4,476,677 to HANSHAW and U.S. Pat. No. 4,303,089 to GAGE ET AL show prior emergency hydraulic fluid systems adapted particularly for use in heavy equipment. These prior devices included an accumulator that was connected to the primary hydraulic power steering system so as to be charged as the vehicle was operated. A sensing device was connected between the pump and the power steering unit in each of these systems, for controlling both the charging of the accumulator and release of hydraulic fluid therefrom. The sensor operated to provide a signal to an accumulator control valve when insufficient fluid pressure was sensed from the pump so as to release the pressurized reserve of hydraulic fluid from the accumulator and direct such fluid to the power steering unit. The reserve fluid was sufficient to operate the power steering unit for a short period of time and until the vehicle could be brought to a safe stop.

Although these prior emergency hydraulic steering systems were generally capable of providing the desired short term backup hydraulic fluid supply, the systems suffered from a number of disadvantages and problems which prevented their widespread use, particularly in smaller passenger vehicles. One such problem or disadvantage with these prior systems was that their complexity made them prohibitively expensive for widespread use in smaller passenger vehicles Another problem is that prior systems cycled the accumulator, that is, charged and discharged the accumulator at least each time the vehicle engine was started and stopped. This created a substantial amount of wear on the accumulator and required that the accumulator have frequent maintenance checks.

It is therefore a general object of the invention to provide an emergency power steering backup system adapted to overcome these and other disadvantages and problems associated with providing emergency power steering. More particularly, it is an object of the invention to provide an emergency power steering backup apparatus and method adapted for use in small vehicles such as automobiles and light trucks.

SUMMARY OF THE INVENTION

A power steering backup system according to the invention includes an emergency fluid supply mounted conveniently on the vehicle for providing an emergency supply of hydraulic fluid to the vehicle's steering unit, and activating means adapted to activate the emergency fluid supply to provide reserve fluid to the steering unit. To reduce complexity and cost, the preferred emergency fluid supply is adapted to provide an emergency supply of hydraulic fluid only once, after which it must be recharged manually. To preserve the preferred manually recharged emergency fluid supply for providing the desired reserve fluid, the activating means is adapted to activate the emergency fluid supply only in truly emergency situations when necessary to steer the vehicle to a safe stop.

The emergency fluid supply preferably includes a manually rechargeable compressed gas container connected by a suitable connecting line to an emergency fluid supply container. The gas container is adapted to hold a quantity of compressed gas while the fluid container is adapted to hold an emergency supply of hydraulic fluid, preferably isolated by suitable means from direct contact with gas from the gas container. When the emergency fluid supply is activated, compressed gas from the gas container is directed through the container connecting line into the fluid container to drive the fluid therein to the vehicle's power steering unit through suitable connecting lines preferably having a suitable pressure regulator.

The preferred activating means includes an electrically controlled activating valve positioned in the container connecting line between the pressurized gas container and the emergency fluid supply container, and sensor means for supplying an activating signal to the activating valve. The activating signal is generated only when the power steering hydraulic pump fails to supply fluid at sufficient operating pressure while the vehicle is traveling above a certain speed.

The sensor means preferably includes a pressure sensor connected to sense the pressure of fluid output from the vehicle3 s hydraulic pump and adapted to close an electrical switch in response to a sensed pressure below a predetermined minimum value. A vehicle speed sensor is also preferably included in the sensor means and is adapted to sense the vehicle speed and to close an electrical switch when the vehicle speed is above a minimum activating value. Preferably, the electrical switches controlled by the pressure sensor and the vehicle speed sensor are connected in series to receive an electrical signal from the vehicle ignition-on switch and to pass the electrical signal on to operate the activating valve only when the conditions are met to close both switches. This is in contrast to prior systems discussed above in which insufficient pressure alone was used to activate an accumulator.

The vehicle speed sensor preferably provides an indication of vehicle speed through the use of a cable connected to the vehicle transmission similar to a speedometer cable. The speed sensor cable is adapted to rotate a magnet to induce an electrical current for closing the switch associated with the sensor when the magnet is rotated at a certain minimum speed. Alternatively, the rotating cable of the vehicle speed sensor may be connected to a centrifugal switch adapted to remain open below a certain rotational speed but to close above a particular rotational speed corresponding to the desired minimum activating vehicle speed.

The preferred form of the invention also includes indicating means for providing a signal to the vehicle driver when the emergency backup system is activated. This signal gives the driver warning so that he or she may pull out of traffic and come to a safe stop before the backup fluid is expended. The preferred indicating means includes both an audio indicator alarm that provides an audio signal such as a tone or an emergency message, and a visual indicator such as a suitable light mounted in the vehicle dashboard. In the preferred form of the invention, the indicators are actuated through the same electrical signal used to actuate the activating valve, that is, a signal from the vehicle ignition-on switch.

Alternatively, or in addition to the pump fluid pressure and vehicle speed sensors, the activating means may also include a pump drive linkage sensor adapted to activate the emergency fluid supply system when the vehicle hydraulic pump drive linkage fails. In most vehicles, the pump is driven by a belt running from the vehicle's engine and the preferred pump drive sensor is adapted to sense the failure of this connecting belt.

The preferred pump drive sensing means includes an idler pulley, biasing means connected to the idler pulley, and a mechanical switch. The idler pulley is adapted to receive the pump drive belt so that the tension of the belt holds the idler pulley in a first position in which the mechanical switch is open. When the belt fails, the biasing means is adapted to move the pulley to an activated position in which the mechanical switch is closed. The switch is preferably connected to receive power through the vehicle ignition-on switch and to pass the ignition-on signal to the activating valve and indicators when closed.

The method according to the invention includes activating the emergency fluid supply to supply emergency fluid for driving the power steering unit when the vehicle's hydraulic pump fails to provide hydraulic fluid at a certain minimum pressure while the vehicle is traveling at a speed above a minimum activating speed. The preferred method includes sensing both the speed of the vehicle and the fluid pressure provided by the vehicle's hydraulic pump and providing an activating signal in response to the simultaneous occurrence of the predetermined vehicle speed and pump pressure conditions. The activating signal operates the activating valve to release the compressed gas from the gas container into the fluid supply container so as to drive the fluid therein to the power steering unit through the fluid supply connecting line. A suitable pressure regulator also preferably regulates the pressure of hydraulic fluid supplied from the emergency fluid supply container to a proper steering unit operating pressure.

The method of the invention also preferably includes the step of indicating inside the vehicle driver's compartment that the emergency fluid supply is activated. This indicating step is preferably performed by actuating both audio an visual indicators in the driver's compartment with the same activating signal used to operate the activating valve.

In one form of the invention, the method also or alternatively includes activating the emergency fluid supply upon failure of the vehicle's hydraulic pump drive linkage. This method preferably includes positioning an idler pulley in an unactivated position with the pump drive belt and biasing the idler pulley to an activated position when such belt breaks. The movement of the pulley to the activated position closes a normally open switch and passes an activating signal to the activating valve and to the indicator devices.

These and other objects, advantages, and features of the invention will be apparent from the following description of the preferred embodiments, considered along with the accompanying drawings.

DESCRIPTION OF THE PREFERRED EMBODIMENTS

Figure 1:
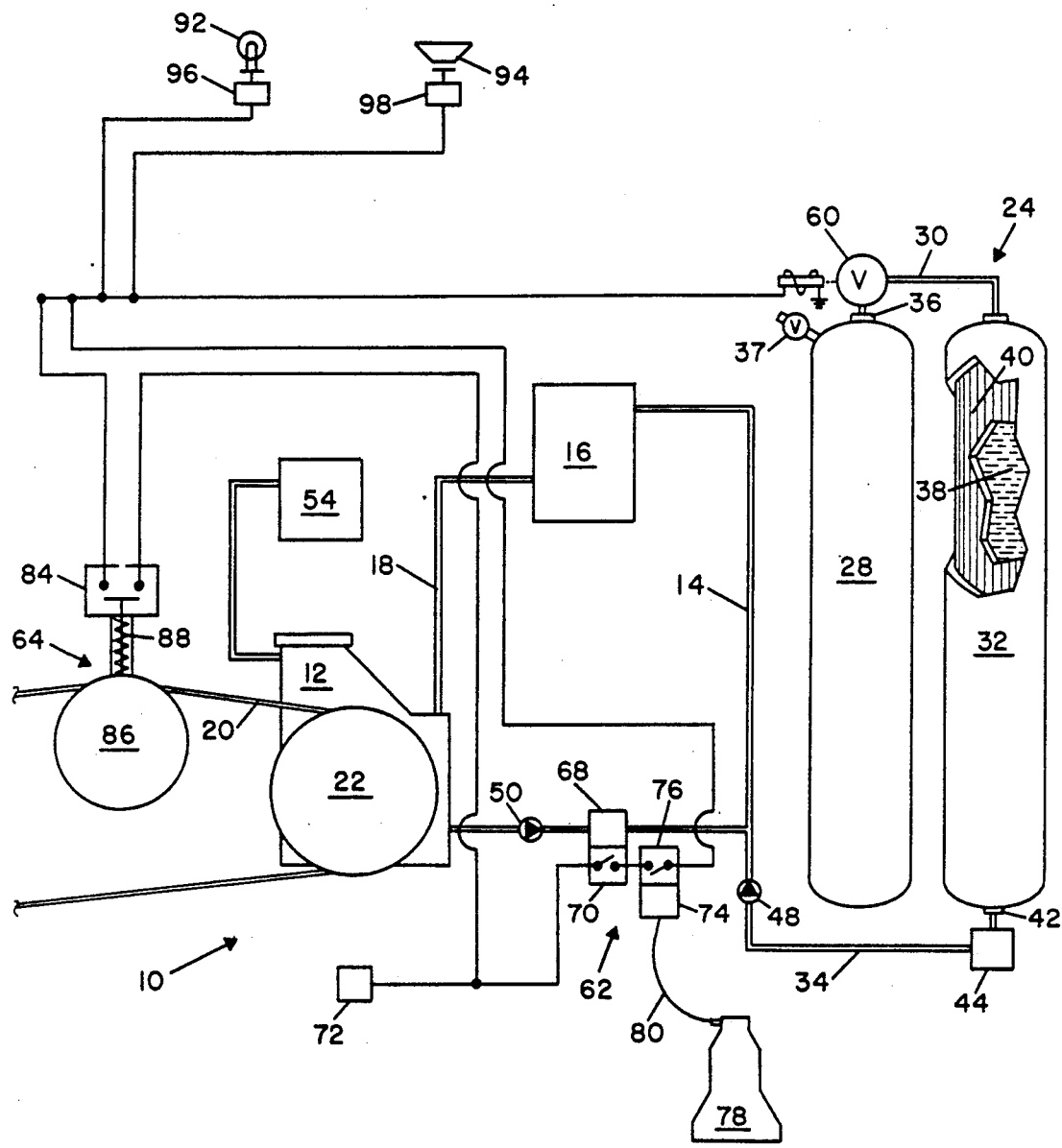
FIG. 1 is a schematic drawing illustrating an emergency power steering backup apparatus embodying the principles of the invention and incorporated in a vehicle's hydraulic power steering system.
Figure 2:
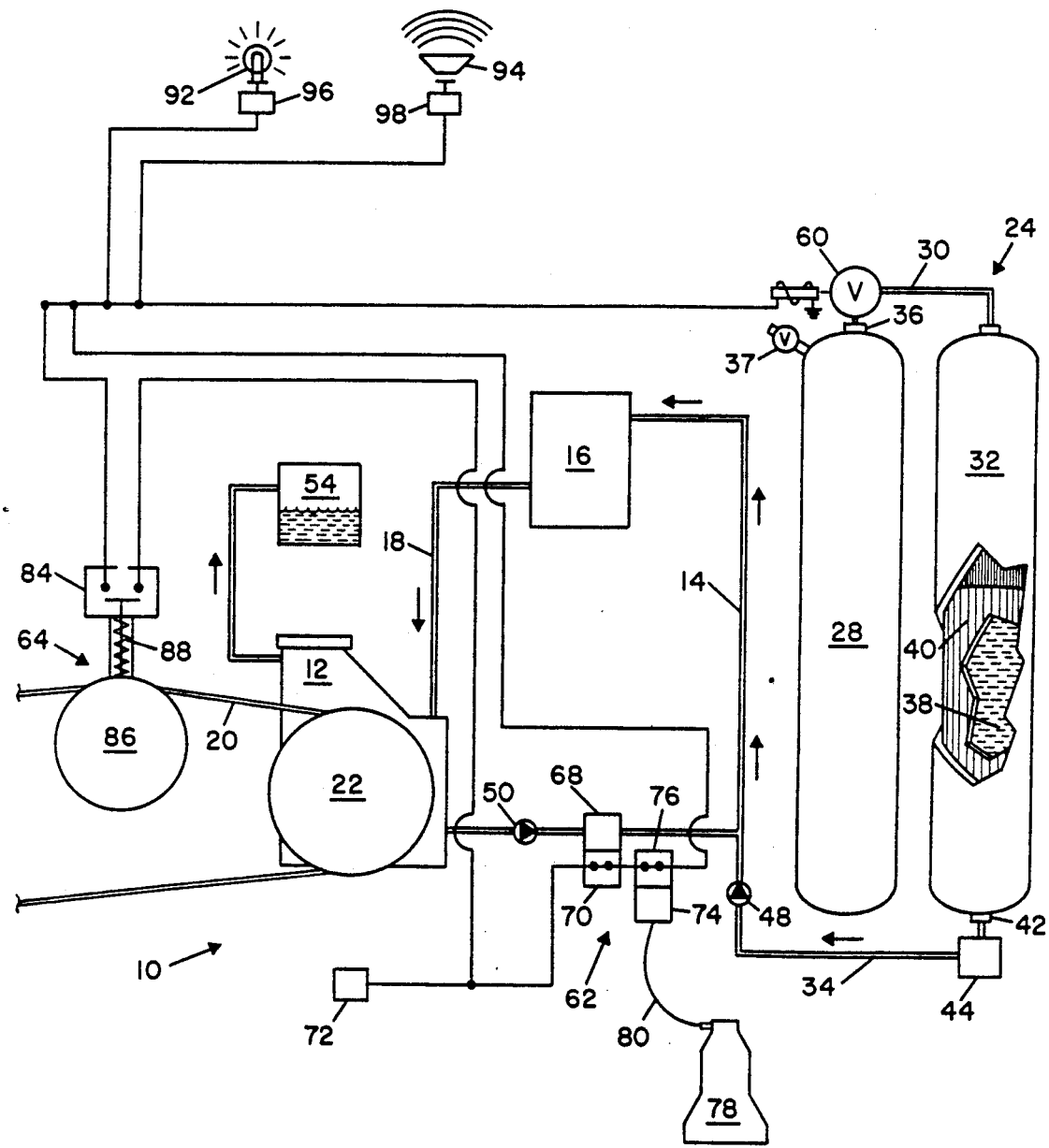
FIG. 2 is a schematic drawing similar to FIG. 1 but showing the emergency power steering backup system in an activated mode.

FIGS. 1 and 2 illustrate a hydraulic power steering system 10 having an emergency power steering backup apparatus embodying the principles of the invention incorporated therein. The power steering system 10 includes a primary fluid supply means, in this case a hydraulic pump 12, connected by a primary power steering fluid line 14 to deliver hydraulic fluid under a desired operating pressure to a power steering unit 16. A pump return line 18 also connects the power steering unit 16 and the pump 12 for returning the power steering fluid to the pump to complete the hydraulic circuit. The pump 12 is driven by the vehicle engine (not shown) through a suitable drive linkage, preferably a drive belt 20, in contact with a suitable pulley or sheave 22 on the pump.

The power steering backup system includes an emergency fluid supply means, generally indicated at reference number 24, adapted to be activated to provide an emergency supply of power steering fluid for temporarily operating the power steering unit 16 after the vehicle pump 12 or other primary steering fluid supply fails. In the illustrated preferred form of the invention, the emergency fluid supply means 24 includes a compressed gas container 28 connected by suitable gas connecting line 30 for supplying compressed gas to an emergency fluid container 32. A suitable emergency fluid connecting line 34 connects the emergency fluid container 32 for delivering the emergency power steering fluid to the power steering unit 16.

The compressed gas container 28 is adapted to contain a suitable compressed gas under a sufficient pressure and in sufficient quantity to force the emergency power steering fluid in the emergency fluid container 32 to the power steering unit 16 under a desired operating pressure for a desired period of time. At least one gas connection 36 is provided in the gas container 28 to which the container connecting line 30 may be connected and through which the gas container may be recharged after each use of the emergency fluid supply. A separate recharging connection 37 may also be provided on the gas container 28 for conveniently recharging the container without disconnecting the container from the gas connecting line 30.

The emergency fluid container 32 is adapted to contain a desired quantity of emergency power steering fluid 38 preferably isolated by suitable means from the gas supplied to the fluid container through the gas connecting line 30. In the preferred form of the invention, the isolating means includes a collapsible bladder 40 made of a suitable material for containing the emergency fluid 38 within the container 32. In the illustrated form of the invention, the bladder 40 is connected for delivering the emergency power steering fluid 38 through a fluid container outlet 42 to the emergency fluid connecting line 34.

The emergency fluid supply also preferably includes a suitable hydraulic fluid pressure regulator 44, such as a suitably sized orifice regulator or some other type of pressure regulator, for regulating the pressure of the emergency power steering fluid supplied to the power steering unit 16 from the container 32. Also, a first check valve 48 is provided in the emergency fluid connecting line 34 for isolating the emergency fluid supply when the pump 12 is properly operating to supply hydraulic fluid to the power steering unit 16. A second check valve 50 is included in the line 14 for isolating the pump 12 from the emergency fluid supplied to the power steering unit 16 when the emergency system is activated.

The illustrated preferred form of the invention includes a emergency fluid supply overflow reservoir 54 for containing the emergency power steering fluid after it is used in the power steering unit 16 to help steer the vehicle. Although most power steering systems include some overflow reservoir capacity such as an enlarged sump for the hydraulic pump, the illustrated overflow reservoir 54 is sized to contain substantially all of the emergency fluid introduced into the primary hydraulic circuit when the emergency apparatus is activated.

The power steering backup system according to the invention also includes activating means for actuating the emergency fluid supply 24 in emergency situations. The preferred activating means includes a solenoid actuated valve 60 and sensor means generally indicated at 62. The valve 60 is preferably positioned in the gas connecting line 30 for releasing compressed gas from the gas container 28 to the emergency fluid container 32. The sensor means 62 is adapted for actuating the activating valve 60 when the fluid pressure from the pump 12 drops below a certain minimum level while the vehicle is traveling at a speed above a minimum activating speed. Alternatively or in addition to the sensor means 62, the power steering emergency backup system may include pump drive linkage sensor means 64 adapted for actuating the valve 60 upon failure of the pump drive linkage, in this case, the belt 20.

The preferred sensor means 62 includes a pump output pressure sensor 68 adapted to operate a switch 70. The pressure sensor is adapted to close the switch 70 when the pressure in the pump output line 14 drops below a minimum pressure required for operating the power steering unit 16. In the illustrated form of the invention, the switch 70 is adapted to receive an electrical signal from the vehicle ignition-on switch 72 and to pass the signal on when closed by the pressure sensor 68.

The preferred sensor means 62 also includes a separate vehicle speed sensor 74 adapted to operate a vehicle speed actuated switch 76. A cable 80 similar to a speedometer cable extends between the speed sensor 74 and the vehicle transmission 78 and is adapted to rotate at a speed proportionate to the vehicle speed. The cable 80 is adapted to rotate a permanent magnet (not shown) within the speed sensor 74 to induce a current for closing the vehicle speed switch 76 when the vehicle is traveling above a minimum activating speed. In the illustrated form of the invention, the vehicle speed actuated switch 76 is adapted to receive the ignition-on signal through the pressure actuated switch 70 and to pas the signal on when closed. When both switches 70 and 76 are closed, the solenoid actuated valve 60 receives an activating signal adapted to open the valve and actuate the emergency fluid supply. The valve 60 is adapted to remain open once the solenoid is energized until it is manually reset.

The preferred drive linkage sensor 64 includes a normally open switch 84 adapted to be operated by the movement of an idler pulley 86 biased toward an activated position by suitable biasing means such as a spring 88. When the idler pulley 86 receives the pump drive belt 20, the belt tension holds it in a first or unactivated position illustrated in FIG. 1. However, absent the force supplied by the pump drive belt 20, the biasing spring 88 biases the idler pulley 86 so as to close the switch 84. In the illustrated preferred form of the invention, the switch 84 is adapted to receive the ignition-on signal from the vehicle's ignition-on switch 72 and to pass the signal on to operate the activating valve 60 when the pump drive belt 20 breaks.

The preferred form of the invention also includes indicator means for providing an indication to the vehicle driver when the power steering emergency backup system is activated. In the preferred form of the invention, the indicator means includes both a visual indicator such as a lamp 92 and an audible indicator such as the sound alarm 94. Both the lamp 92 and alarm 94 are adapted to be activated through suitable relays 96 and 98 respectively (connections not shown) by the same activating signal used to operate the activating valve 60. In the preferred form of the invention, this activating signal is provided through the vehicle's ignition-on switch 72.

The method of the invention and operation of the emergency power steering backup apparatus may be described with particular reference to FIG. 2. The method includes first charging the emergency fluid supply means 24 for providing an emergency supply of power steering fluid to operate the steering unit 16. With the emergency fluid supply means 24 charged, the method next includes activating the fluid supply means when the pressure of fluid supplied by the pump 12 drops below a predetermined minimum pressure while the vehicle is traveling at a speed above a minimum activating speed. The method of the invention may also or alternatively, include activating the emergency fluid supply means 24 in response to a failure of the pump 12 drive linkage, in this case, the pump drive belt 20. To inform the vehicle driver that the primary steering system has failed, the method also preferably includes the step of indicating to the vehicle driver when the emergency fluid supply 24 has been activated. This indicating step allows the driver to steer the vehicle to a safe stop before the emergency fluid supply is expended.

In the preferred form of the invention shown in FIG. 2, the emergency fluid 38 from the emergency fluid supply means 24 is activated by the solenoid actuated activating valve 60 positioned in the gas connecting line 30 between the gas container 28 and the fluid container 32. When the valve 60 is opened, compressed gas from the gas container 28 flows through the connecting line 30 into the fluid container 32 to drive the emergency power steering fluid 38 therein. As shown in FIG. 2, the method of the invention preferably includes isolating the emergency fluid 38 from the compressed gas by suitable means such as the collapsible bladder 40 mounted within the fluid container 32 or a suitable piston arrangement (not shown) within the container.

From the emergency fluid container 32, the fluid 38 is forced under the pressure of the compressed gas through the emergency fluid connecting line 34 into the line 14 of the primary power steering circuit as indicated by the arrows in FIG. 2. To provide the fluid at a desired operating pressure level, the method also includes regulating the pressure of the emergency fluid from the fluid container 32 with the pressure regulator 44 positioned in the emergency fluid connecting line 34. Also, the check valve 50 prevents the flow of emergency fluid back through the inoperable pump 12. From the line 14, the emergency fluid flows to the power steering unit 16 where it may be used in steering the vehicle, and then to the pump 12 through the pump return line 18. The emergency fluid is finally collected in the overflow reservoir 54.

The step of activating the fluid supply means 24 includes sensing the pressure of the fluid from the pump 12 with the sensor 68 and closing the pressure activated switch 70 in response to a sensed pressure below a minimum operating pressure. The method also includes sensing the vehicle speed through the speed sensor 74 operated through the cable 80 from the transmission 78 and closing the vehicle speed activated switch 76 in response to a sensed speed above a minimum activating speed. When both switches 70 and 76 are closed, a signal from the ignition-on switch 72 is directed to the solenoid of the solenoid actuated valve 60 for opening the valve. Once actuated, the valve 60 is adapted to remain open until manually reset to the closed position.

The speed sensor 74 and speed activated switch 76 prevent the emergency fluid supply means 24 from being activated in non-emergency situations when the vehicle is not traveling at or above the minimum activating speed. Therefore, in situations where the vehicle's engine stalls at startup or at a stop light, for example, the preferred manually recharged emergency fluid supply means 24 is not expended even though the pressure sensor 68 indicates a lack of power steering fluid under the proper pressure from the hydraulic pump 12.

The step of activating the emergency power steering fluid supply means 24 upon failure of the pump drive linkage preferably includes sensing the drive linkage, in this case, the pump drive belt 20 and providing an activating signal to activate the solenoid actuated valve 60 when the belt 20 fails. In the preferred form of the invention, this belt sensing step includes biasing the idler pulley 86 away from a normal unactivated or first position to close the normally open switch 84 and thereby provide the activating signal for the valve 60. Again, the activating signal is preferably supplied through the vehicle's ignition-on switch 72.

The step of providing an indication to the driver when the fluid supply means 24 is activated preferably includes providing both a visual indication by energizing the indicator lamp 92 and an audible signal through the alarm 94. Preferably, the same signal used to operate the solenoid actuated valve 60 is used to switch the lamp 92 and sound alarm 94 on by suitable relay means 96 and 98.

The above described preferred embodiments are intended to illustrate the principles of the invention, but not to limit the scope of the invention. Various other embodiments and modifications to these preferred embodiments may be made by those skilled in the art without departing from the scope of the following claims. For example, different speed and pressure sensor arrangements and associated switches may be used within the scope of the invention.

I claim:

1. An emergency power steering backup apparatus for vehicles having a fluid operated power steering unit, said apparatus comprising:
   A. emergency power steering fluid supply means connected to the power steering unit and adapted to be activated for temporarily providing power steering fluid to the power steering unit for operating said power steering unit; and
   B. activating means for receiving an activating signal and for releasing the emergency power steering fluid supply so as to flow to the power steering unit in response to the activating signal; and
   C. sensor means for sensing the pressure of the fluid supplied to the vehicle's power steering unit in normal operation and the speed of the vehicle, and for providing the activating signal capable of operating the activating means when the sensed fluid pressure drops below a minimum value while the sensed vehicle speed is above a certain predetermined minimum speed.

2. The apparatus of claim 1 wherein the vehicle includes an electrical storage battery and an ignition-on switch and wherein the sensor means is adapted to receive power from the vehicle battery through the ignition-on switch for providing the activating signal.

3. The apparatus of claim 2, further comprising:
   A. indicator means mounted on the vehicle for providing an indication to the vehicle driver when the emergency power steering fluid supply means is activated.

4. The apparatus of claim 3, wherein the indicator means includes:
   A. an audio indicator adapted to be activated by the activating signal; and
   B. a visual indicator adapted to be activated by the activating signal.

5. The apparatus of claim 2 wherein the sensor means includes:
   A. a pressure activated switch connected for receiving electrical current from the vehicle battery through the ignition-on switch;
   B. pressure sensor means for closing the pressure activated switch when the sensed pressure falls below the predetermined minimum value;
   C. a vehicle speed activated switch connected for receiving electrical current from the vehicle battery through the ignition-on switch when the pressure activated switch is closed; and D. vehicle speed sensing means for closing the vehicle speed activated switch when the sensed vehicle speed is above the predetermined minimum value.

6. The apparatus of claim 5, wherein the activating means is a solenoid operated valve adapted to remain closed once the solenoid is energized until manually opened.

7. The apparatus of claim 6 wherein the emergency power steering fluid supply means includes:
   A. compressed gas container means for holding a supply of compressed gas;
   B. emergency fluid container means for containing an emergency fluid supply isolated from the gas in the compressed gas container and being connected to the compressed gas container by a gas connecting line in which the solenoid operative valve is positioned;
   C. an emergency fluid container means to a primary power emergency fluid container means to a primary power steering fluid line leading to the power steering unit;
   D. regulator means connected in the emergency fluid connecting line for regulating the pressure of the fluid supplied from the emergency fluid container means;
   E. a first check valve positioned in the emergency fluid connecting line for preventing flow of fluid from the fluid connecting line into the emergency fluid container means; and
   F. a second check valve positioned in the primary power steering fluid line for preventing the flow of power steering fluid from the emergency fluid container means directly to the vehicle's primary power steering fluid supply means when the emergency power steering fluid supply is activated.

8. The apparatus of claim 3 further including drive linkage sensor means for providing an activating signal to the activating means upon the failure of the drive linkage between the vehicle engine and the vehicle primary power fluid supply means.

9. The apparatus of claim 8 wherein the drive linkage sensor means includes:
   A. an idler pulley adapted to receive a belt which is drivingly engaged with the primary power steering fluid supply means and adapted to be held in a first position by contact with the belt;
   B. biasing means for biasing the idler pulley away from the first position; and
   C. a normally open linkage switch connected between the vehicle ignition-on switch and the indicator means and activating valve, the linkage switch being adapted to close when the idler pulley is moved substantially out of the first position by the biasing means.

10. An emergency power steering backup apparatus for vehicles having a fluid operated power steering unit, said apparatus comprising:
    A. emergency power steering fluid supply means connected to the power steering unit and adapted to be activated for temporarily providing power steering fluid to the power steering unit for operating said power steering unit;
    B. an idler pulley adapted to receive a belt which is drivingly engaged between a vehicle power steering fluid pump and a vehicle engine, the idler pulley being adapted to be held in a first position by contact with the belt when the belt is properly engaged between the vehicle engine and the power steering fluid pump;
    C. biasing means for biasing the idler pulley away from the first position; and
    D. a normally open linkage switch connected between a vehicle ignition-on switch and an electrically controlled emergency power steering fluid supply actuating valve adapted to release fluid from the emergency power steering fluid supply means on receipt of a signal provided through the vehicle ignition-on switch, the linkage switch being adapted to close when the idler pulley is moved substantially out of the first position by the biasing means.

11. The apparatus of claim 10 further comprising:
    A. indicator means mounted on the vehicle for providing an indication to the vehicle driver when the emergency power steering fluid supply means is activated.

12. An emergency power steering backup method for vehicles having a fluid operated power steering unit that receives power steering fluid in normal operation from a power steering fluid pump, the method comprising the steps of:
    A. charging an emergency power steering fluid supply adapted to be activated for temporarily providing power steering fluid to the power steering unit for operating said power steering unit; and
    B. sensing the speed of the vehicle;
    C. sensing the pressure of power steering fluid supplied from the power steering fluid pump;
    D. providing an activating signal when the sensed pressure drops below a predetermined minimum pressure while the sensed speed of the vehicle is above a predetermined minimum activating speed; and
    E. activating the emergency power steering fluid supply with the activating signal.

13. The method of claim 12 including the step of indicating to the vehicle driver when the emergency power steering fluid supply is activated.

14. The method of claim 12 wherein the step of charging the emergency power supply includes:
    A. manually filling a compressed gas container with a suitable compressed gas at a desired pressure;
    B. filling a power steering fluid container with an emergency supply of power steering fluid, the steering fluid container being connected to the compressed gas container; and
    C. separating the power steering fluid container from the compressed gas with an activating valve adapted to be activated by said activating signal.

15. The method of claim 12 including the step of:
    A. activating the emergency fluid supply so as to direct the emergency fluid to the steering unit when the vehicle's hydraulic pump drive linkage fails.

16. The method of claim 15 wherein the drive linkage includes a drive belt running between the vehicle engine and the vehicle's hydraulic pump and the step of activating the emergency fluid supply when the vehicle's hydraulic pump drive linkage fails includes the steps of:
    A. biasing an idler pulley which receives the drive belt in normal operation, away from an unactivated position in which said idler pulley is held by the drive belt;
    B. closing a normally open switch to provide an activating signal in response to the movement of the idler pulley away from the unactivated position; and
    C. activating the emergency power steering fluid supply with the activating signal.

* * * * *